United States Patent
Li et al.

(10) Patent No.: US 12,182,469 B2
(45) Date of Patent: Dec. 31, 2024

(54) MILLIMETER-WAVE COMMUNICATION CHIP, DISPLAY DEVICE, AND METHOD

(71) Applicant: DECO INTEGRATION TECHNOLOGY CO., LIMITED, Shenzhen (CN)

(72) Inventors: Cheng Li, Shenzhen (CN); Wenxue Jin, Shenzhen (CN)

(73) Assignee: DECO INTEGRATION TECHNOLOGY CO., LIMITED, Shenzhen (CN)

( * ) Notice: Subject to any disclaimer, the term of this patent is extended or adjusted under 35 U.S.C. 154(b) by 0 days.

(21) Appl. No.: 18/477,459

(22) Filed: Sep. 28, 2023

(65) Prior Publication Data

US 2024/0028289 A1    Jan. 25, 2024

Related U.S. Application Data

(63) Continuation of application No. PCT/CN2021/092343, filed on May 8, 2021.

(30) Foreign Application Priority Data

Mar. 31, 2021   (CN) .......................... 202110347141.0

(51) Int. Cl.
*G06F 3/147*        (2006.01)
*H04J 3/02*         (2006.01)

(52) U.S. Cl.
CPC ............... *G06F 3/147* (2013.01); *H04J 3/02* (2013.01)

(58) Field of Classification Search
CPC .................................. G06F 3/147; H04J 3/02
See application file for complete search history.

(56) References Cited

U.S. PATENT DOCUMENTS

| 10,593,256 | B2 * | 3/2020 | Li ......................... G09G 5/006 |
| 11,829,678 | B2 * | 11/2023 | Wang ................... G09G 5/006 |
| 2019/0295457 | A1 * | 9/2019 | Li ........................... G09G 3/32 |
| 2022/0350562 | A1 * | 11/2022 | Wang ................... G09G 5/006 |

FOREIGN PATENT DOCUMENTS

| CN | 112311413 A | 2/2021 |
| CN | 212811861 U | 3/2021 |

* cited by examiner

*Primary Examiner* — Peter D McLoone

(57) ABSTRACT

Disclosed are a millimeter-wave communication chip, a display device, and a method. The millimeter-wave communication chip can achieve communication connection between a first terminal and a second terminal. A back plate and a light-emitting diode (LED) module in the display device are respectively provided with a first millimeter-wave communication chip and a second millimeter-wave communication chip. Wireless communication between the two millimeter-wave communication chips can achieve wireless communication connection between the back plate and the LED module, so that the layout of the LED module can be more lightweight and flexible; the back plate sends display data to the LED module through the second millimeter-wave communication chip and receives feedback data of the LED module, and the LED module receives and displays the display data of the back plate through the first millimeter-wave communication chip and sends the feedback data to the back plate.

9 Claims, 6 Drawing Sheets

MILLIMETER-WAVE COMMUNICATION CHIP, DISPLAY DEVICE, AND METHOD

CROSS-REFERENCE TO RELATED APPLICATIONS

The present application claims benefit of Chinese Patent Application No. 202110347141.0, filed on Mar. 31, 2021, entitled "Display Device Adopting Millimeter-Wave Communication", the contents of which are hereby incorporated by reference in its entirety.

FIELD OF TECHNOLOGY

The present application relates to the field of communications, and particularly relates to a millimeter-wave communication chip, a display device, and a method.

BACKGROUND

A related display device, for example, an image splicer, which is also known as a television wall controller, a television wall splicer, a display wall splicer, and the like, has the main function of dividing an intact image signal into N blocks which are distributed to N video display units (such as back projection units) to form an oversized screen dynamic image display screen with a plurality of common video units, which can support simultaneous access of various video equipment.

SUMMARY

Technical Problem

A connecting mode of a related back plate and display modules usually adopts a connection by communication cables. Besides many communication cables, connection lines for the back plate and the display module also include cables such as power lines and data lines. One back plate is usually connected to a plurality of display modules. One can imagine that there are many cables between the back plate and the display device. The excessive communication cables cause problems that the connecting lines between the back plate and the display modules are complex, the connecting difficulty is high, and a lot of time needs to be consumed to clean the communication cables.

Technical Solution for the Technical Problem

Technical Solution

To overcome defects in the related art, the present application is to provide a millimeter-wave communication chip, a display device, and a method. The millimeter-wave communication chip can achieve a communication connection between a first terminal and a second terminal. Therefore, wireless communication connection between the back plate and a light-emitting diode (LED) module can be achieved, and a communication effect between the back plate and the LED module can also be achieved without connecting many communication cables, so that the layout of the LED module can be more lightweight and flexible.

In order to achieve the above objective, the application adopts the following technical solution:

The present application provides a millimeter-wave communication chip, including:

a radio frequency (RF) module, configured to receive and send data;
 a Serializer/Deserializer (SerDes) module, configured to convert parallel data into serial data or the serial data into the parallel data; and
 a time division multiplexing (TDM) module controlling data transmission directions of the RF module and the SerDes module by adopting a time division multiplexing mode, wherein
 when the SerDes module receives parallel data of a first terminal, the TDM module sends a control signal to the SerDes module and the RF module, the SerDes module converts the parallel data into serial data and sends the serial data to the RF module, and the RF module sends the serial data to a second terminal; and
 when the RF module receives the serial data of the second terminal, the TDM module sends a control signal to the SerDes module and the RF module, the RF module sends the serial data to the SerDes module, and the SerDes module converts the serial data into parallel data and sends the parallel data to the first terminal.

In an embodiment, the millimeter-wave communication chip further includes a data processing module, the SerDes module being in communication connection with the first terminal through the data processing module, wherein
 the data processing module is configured to receive the control signal of the TDM module, and the data processing module, according to the control signal, sends the data of the first terminal to the SerDes module after analyzing and processing the data of the first terminal, or sends the data of the SerDes module to the first terminal after analyzing and processing the data of the SerDes module.

In an embodiment, the millimeter-wave communication chip further includes a plurality of interface modules and a data caching module, wherein
 the interface modules are configured to be connected to the first terminal;
 the data caching module is configured to establish communications between the data processing module and the interface modules;
 when the interface modules receive the data of the first terminal, the interface modules send the data of the first terminal to the data caching module for caching, and the data caching module then transmits the data of the first terminal to the data processing module; and
 when the data processing module receives the data of the second terminal, the data processing module sends the data of the second terminal to the data caching module for caching, and the data caching module then transmits the data of the second terminal to the interface modules.

A display device adopting millimeter wave communication, including a back plate and a light-emitting diode (LED) module, wherein the back plate is configured to acquire input data, to generate image data after analyzing and processing the input data, and to send the image data to the LED module, and the LED module is configured to receive video data sent by the back plate, and to display the video data through an LED after analyzing the video data; and further comprising the millimeter-wave communication chip, the millimeter-wave communication chip including a first millimeter-wave communication chip and a second millimeter-wave communication chip, wherein
 the first millimeter-wave communication chip is arranged on the LED module, and the second millimeter-wave communication chip is arranged on the back plate;
 the LED module includes an output main control board;

the first millimeter-wave communication chip is configured to be in communication connection with the back plate;

the output main control board is configured to receive data of the first millimeter-wave communication chip for outputting and displaying;

the first millimeter-wave communication chip is electrically connected to the output main control board; and the back plate includes a microcontroller unit (MCU) main control board;

the second millimeter-wave communication chip is configured to receive a control signal and relevant data of the MCU main control board and to be in communication connection with the LED module;

the MCU main control board is configured to receive each input signal, to analyze and process the input signal, and to control operation of the second millimeter-wave communication chip; and the second millimeter-wave communication chip is electrically connected to the MCU main control board.

In an embodiment, the first millimeter-wave communication chip is in communication connection with the second millimeter-wave communication chip, and the first millimeter-wave communication chip and the second millimeter-wave communication chip adopt a time division multiplexing communication mode.

In an embodiment, the display device adopting millimeter-wave communication further includes an input module, wherein the input module is in communication connection with the back plate, and is configured to input image signals.

In an embodiment, the input module includes a third millimeter-wave communication chip and an input main control board, and the third millimeter-wave communication chip is configured to be in communication connection with the first millimeter-wave communication chip and to send the image signals to the first millimeter-wave communication chip.

In an embodiment, the display device adopting millimeter-wave communication further includes an input module, wherein the input module is in communication connection with the back plate, and is configured to input image signals.

In an embodiment, the input module includes a third millimeter-wave communication chip and an input main control board, and the third millimeter-wave communication chip is configured to be in communication connection with the first millimeter-wave communication chip and to send the image signals to the first millimeter-wave communication chip.

In an embodiment, the LED module further includes an output video interface circuit and an output audio separation circuit, wherein a first output interface of the output main control board is electrically connected to the output video interface circuit, and a second output interface of the output main control board is electrically connected to the output audio separation circuit.

In an embodiment, the output video interface circuit includes a high-definition output chip and a high-definition multimedia interface (HDMI), a signal output terminal of the high-definition output chip is electrically connected to the HDMI, and a signal input terminal of the high-definition output chip is electrically connected to the output main control board.

In an embodiment, the output audio separation circuit includes a decoding chip, and a signal input terminal of the decoding chip is electrically connected to the output main control board.

A method adopting millimeter-wave communication, applied to the display device adopting millimeter-wave communication, including the following steps:

electrifying the display device, wherein the second millimeter-wave communication chip is in a wireless receiving status;

configuring the first millimeter-wave communication chip, and establishing wireless communication between the first millimeter-wave communication chip and the second millimeter-wave communication chip;

configuring the second millimeter-wave communication chip; and sending, by the back plate, display data, communicating the first millimeter-wave communication chip with the second millimeter-wave communication chip, and displaying the display data on the LED module.

In an embodiment, after configuring the second millimeter-wave communication chip, the method further includes the following steps:

reading, by the MCU main control board, status information of the LED module through the first millimeter-wave communication chip; and initially configuring the LED module.

In an embodiment, the method further includes the following steps:

in a case where backhaul information of the LED module needs to be read, sending, by the MCU main control board, corresponding commands to the LED module through the first millimeter-wave communication chip;

receiving, by the first millimeter-wave communication chip, the backhaul data of the LED module; and reading, by the MCU main control board, an effective status of the backhaul data of the first millimeter-wave communication chip.

Beneficial Effects of the Present Invention

Beneficial Effects

The present application has the following beneficial effects:

The present application provides a millimeter-wave communication chip, a display device, and a method. The millimeter-wave communication chip can achieve communication connection between the first terminal and the second terminal. The back plate and the LED module in the display device are respectively provided with the first millimeter-wave communication chip and the second millimeter-wave communication chip. The wireless communication between the two millimeter-wave communication chips can achieve the wireless communication connection between the back plate and the LED module, the back plate sends display data to the LED module through the second millimeter-wave communication chip and receives feedback data of the LED module, and the LED module receives and displays the display data of the back plate through the first millimeter-wave communication chip and sends the feedback data to the back plate. Through the wireless communication between the millimeter-wave communication chips, a communication effect between the back plate and the LED module can also be achieved without connecting many communication cables, so that the layout of the LED module can be more lightweight and flexible.

BRIEF DESCRIPTION OF THE DRAWINGS

In order to describe the embodiments of the present application or the technical solutions in the prior art more clearly, drawings needed to be used in the embodiments or the prior art will be briefly introduced below. It is apparent that the drawings described below are merely some embodiments of the present application, and those of ordinary skill in the art can further obtain other drawings according to the drawings without making creative efforts.

Figure 1:
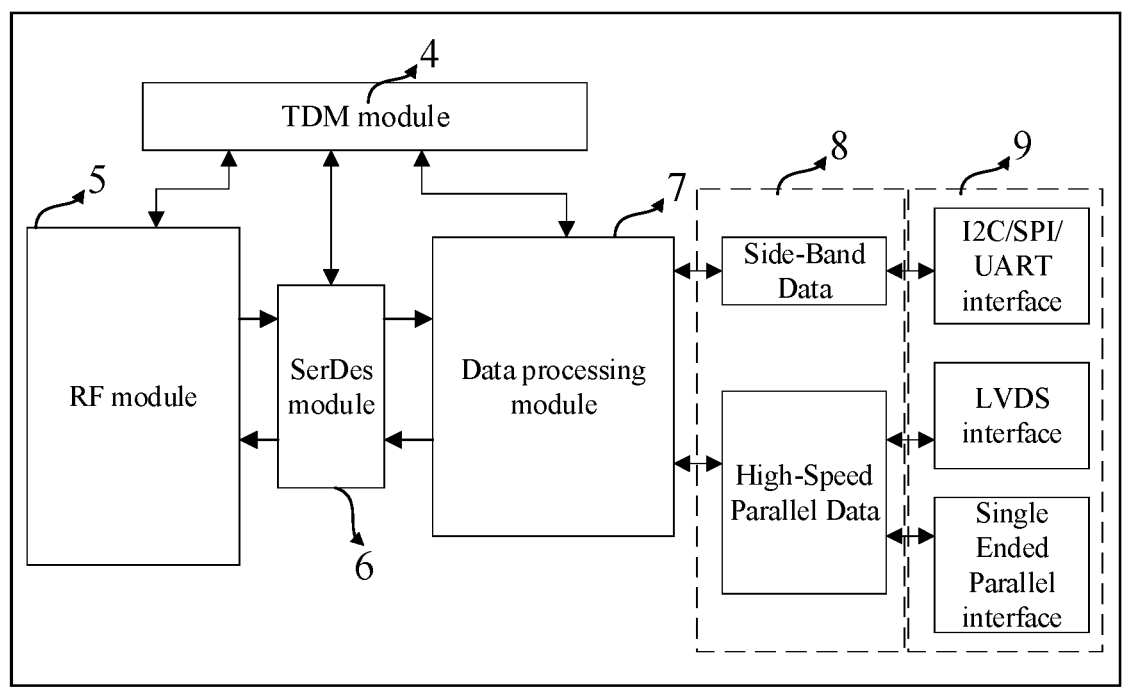
FIG. 1 is a schematic diagram of a millimeter-wave communication chip provided in a specific implementation mode of the present application.

Numerals in the drawings: 1—LED module; 11—first millimeter-wave communication chip; 12—output main control board; 13—output video interface circuit; 14—output audio separation circuit; 2—back plate; 21—second millimeter-wave communication chip; 22—MCU main control board; 3—output module; 31—input main control board; 32—third millimeter-wave communication chip; 4—TDM module; 5—RF module; 6—SerDes module; 7—data processing module; 8—data caching module; 9—interface module.

DESCRIPTION OF THE EMBODIMENTS

Implementation Modes of the Present Invention

The technical solutions in the embodiments of the present application will be clearly and intactly described below in combination with the drawings in the embodiments of the present application. Apparently, the embodiments described are only some embodiments rather than all embodiments of the present application. On the basis of the embodiments in the present application, all other embodiments obtained by those of ordinary skill in the art without making creative efforts shall fall into the scope of protection of the present application.

Nouns frequently used by those skilled in the art in the document of the present application are explained as follows:

RF module: radio frequency module which achieves a wireless receiving and sending function;

SerDes module: an abbreviation for an English SERializer (serializer)/DESerializer (deserializer);

TDM module: a time division multiplexing module, a communication technique which interweaves different signals in different time periods and transmits the signals in a same channel; and extracts the signals in each time period with a certain method at a receiving terminal and reduces the signals to original signals. This technique can be used to transmit multichannel signals in the same channel.

Back plate: a main control board arranged in a splicing process to play a role of controlling input and output of image signals.

The technical solutions of the present application are further described through specific embodiments in combination with the drawings.

Embodiment I

As shown in FIG. 1, a millimeter-wave communication chip, including:

a radio frequency (RF) module 5, configured to receive and send data;

a serializer/deserializer (SerDes) module 6, configured to convert parallel data into serial data or the serial data into the parallel data; and a time division multiplexing (TDM) module 4 controlling data transmission directions of the RF module 5 and the SerDes module 6 by adopting a time division multiplexing mode, wherein when the SerDes module 6 receives parallel data of a first terminal, the TDM module 4 sends a control signal to the SerDes module 6 and the RF module 5, the SerDes module 6 converts the parallel data into serial data and sends the serial data to the RF module 5, and the RF module 5 sends the serial data to a second terminal; and when the RF module 5 receives the serial data of the second terminal, the TDM module 4 sends a control signal to the SerDes module 6 and the RF module 5, the RF module 5 sends the serial data to the SerDes module 6, and the SerDes module 6 converts the serial data into the parallel data and sends the parallel data to the first terminal.

Specifically, the first terminal and the second terminal are terminals at both ends of the millimeter-wave communication chip, and can be the back plate and the LED module, and a master control device and a controlled device, and the like. The millimeter-wave communication chip has the data receiving and sending function. The TDM module 4 completes a switching function of the transmission direction of the whole data channel in a time division multiplexing mode as needed, i.e., the TDM module 4 is configured to switch between data receiving and data sending of the millimeter-wave communication chip.

As the millimeter-wave communication chip will run on one of the terminals, in the embodiment, the millimeter-wave communication chip is placed on the first terminal, and the second terminal also has the wireless communication function and can be also provided with the millimeter-wave communication chip or other wireless communication modules; when the millimeter-wave communication chip sends data, the data received by the SerDes module 6 is sent to the RF module 5 and is then sent by the RF module 5 to the second terminal. On the contrary, when the millimeter-wave communication chip receives data, the data received by the RF module 5 is sent to the SerDes module 6 and is then sent by the SerDes module 6 of the first terminal; and the TDM module 4 completes the switching function of the transmission direction of the whole data channel in the time division multiplexing mode according to different circumstances.

In an embodiment, the millimeter-wave communication chip further includes a data processing module 7, the SerDes module 6 being in communication connection with the first terminal through the data processing module 7, wherein the data processing module 7 is configured to receive the control signal of the TDM module 4, and the data processing module 7, according to the control signal, sends the data of the first terminal to the SerDes module 6 after analyzing and processing the data of the first terminal, or sends the data of the SerDes module to the first terminal after analyzing and processing the data of the SerDes module 6.

Specifically, the data processing module 7 is configured to synthesize or separate the data. When the data of the first terminal is transmitted to the data processing module 7 through the plurality of interface modules 9, the data processing module 7 synthesizes the data of the first terminal and sends the synthesized data to the SerDes module 6; or, when the SerDes module 6 transmits the data of the second terminal to the data processing module 7, the data processing module 7 separates the data of the second terminal and sends the separated data to the first terminal through the plurality of interface modules 9; and the TDM module 4 plays a role of controlling the flow direction of the data between the first terminal and the second terminal, and the data module plays a role of synthesizing or separating the data according to the flow direction of the data currently controlled by the TDM module 4.

In an embodiment, the millimeter-wave communication chip further includes a plurality of interface modules 9 and a data caching module 8, wherein the interface modules 9 are configured to be connected to the first terminal;

the data caching module 8 is configured to establish communications between the data processing module 7 and the interface modules 9;

when the interface modules 9 receive the data of the first terminal, the interface modules 9 send the data of the first terminal to the data caching module 8 for caching, and the data caching module 8 then transmits the data of the first terminal to the data processing module 7; and when the data processing module 7 receives the data of the second terminal, the data processing module 7 sends the data of the second terminal to the data caching module 8 for caching, and the data caching module 8 then transmits the data of the second terminal to the interface modules 9.

Specifically, as can be seen from above, in the embodiment, the millimeter-wave communication chip is arranged on the first terminal, so the interface modules 9 are connected to the first terminal. In a similar way, if the millimeter-wave communication chip is arranged on the second terminal, the interface modules 9 are connected to the second terminal; the interface modules 9 are configured to receive different data signals, and the data caching module 8 mainly plays a role of caching the data transmitted by the first terminal to the data processing module 7.

In the embodiment, the plurality of interface modules 9 include an inter-integrated circuit (I2C)/serial peripheral Interface (SPI)/universal asynchronous receiver/transmitter (UART) interface, a low voltage differential signaling (LVDS) interface, and a single-ended parallel interface; and the data caching module 8 includes a High-Speed Parallel Data module and a Side-Band Data module, wherein the High-Speed Parallel Data module is responsible for caching data transmitted by the LVDS interface and the single-ended parallel interface, and the Side-Band Data module is responsible for caching data transmitted by the I2C/SPI/UART interface.

In conclusion, there are two working conditions in the embodiment:

First, the first terminal sends the data to the second terminal; the TDM module controls the data processing module 7, the SerDes module 6, and the RF module 5 in the time division multiplexing mode according to the transmission direction of the output of the first terminal to the second terminal, so that the data of the first terminal is transmitted to the second terminal; the specific transmission process is as follows: the millimeter-wave communication chip receives various data of the first terminal through the I2C/SPI/UART interface, the LVDS interface, and the single-ended parallel interface, caches the data through the High-Speed Parallel Data and the Side-Band Data module, and sends the various data of the first terminal to the data processing module 7. The data processing module 7 synthesizes the various data of the first terminal and sends the data to the SerDes module 6. The data received by the interface modules 9 is the parallel data. Therefore, the SerDes module 6 converts the received parallel data into the serial data and sends the serial data to the RF module 5. The RF module 5 then wirelessly sends the data of the first terminal to the second terminal through the millimeter-wave communication.

Second, the second terminal feeds back the data to the first terminal; the TDM module controls the data processing module 7, the SerDes module 6, and the RF module 5 in the time division multiplexing mode according to the transmission direction of the output of the second terminal to the first terminal, so that the data of the second terminal is transmitted to the first terminal; the specific transmission process is as follows: the RF module 5 receives the feedback data of the second terminal though millimeter-wave wireless communication, and sends the feedback data to the SerDes module 6. As the RF module 5 receives the serial data, the SerDes module 6 converts the serial data of the second terminal into the parallel data and sends the parallel data to the data processing module 7. The data processing module 7 receives the parallel data and separates the parallel data, and sends the separated data to the High-Speed Parallel Data module and the Side-Band Data module. The High-Speed Parallel Data module and the Side-Band Data module sends the separated data to the I2C/SPI/UART interface, the LVDS interface, and the single-ended parallel interface and caches the same, and finally, the I2C/SPI/UART interface, the LVDS interface, and the single-ended parallel interface send the data to the first terminal.

Embodiment II

Figure 2:
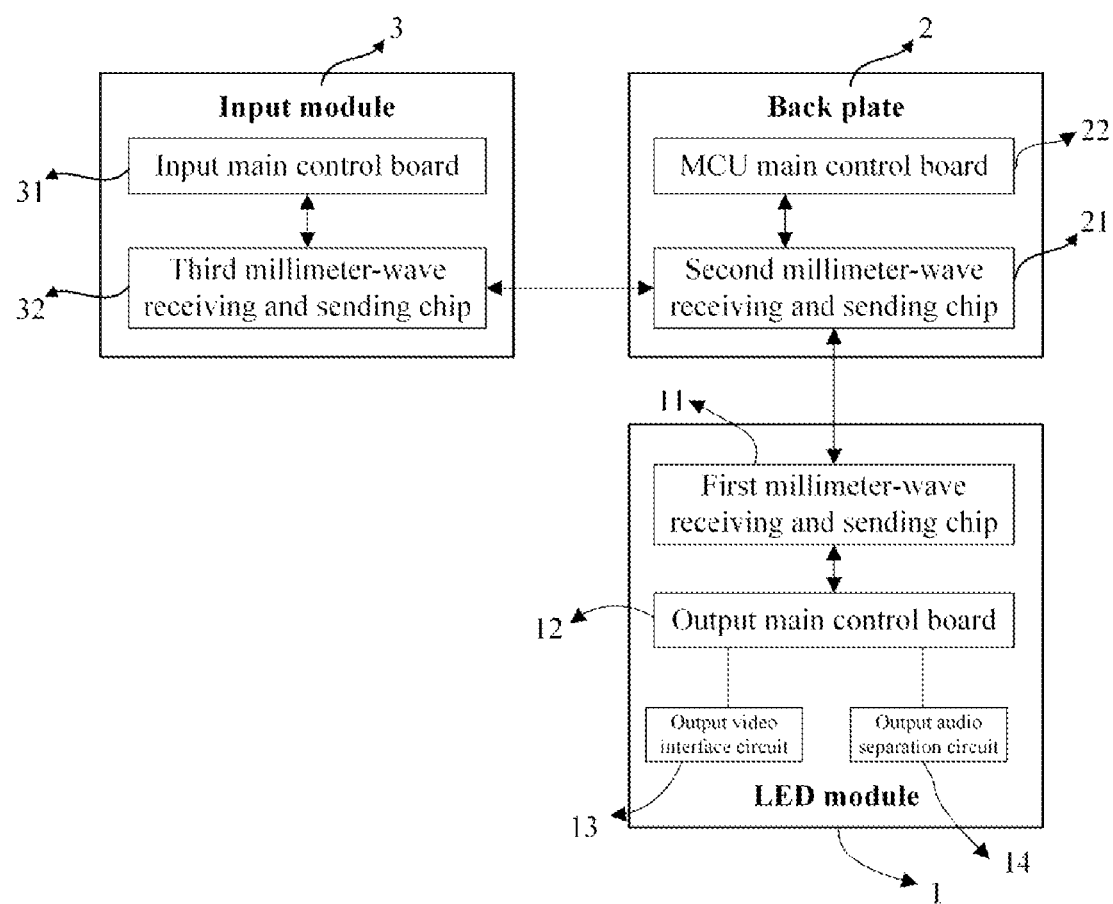
FIG. 2 is a schematic diagram I of a display device adopting a millimeter-wave communication provided in the specific implementation mode of the present application.
Figure 3:
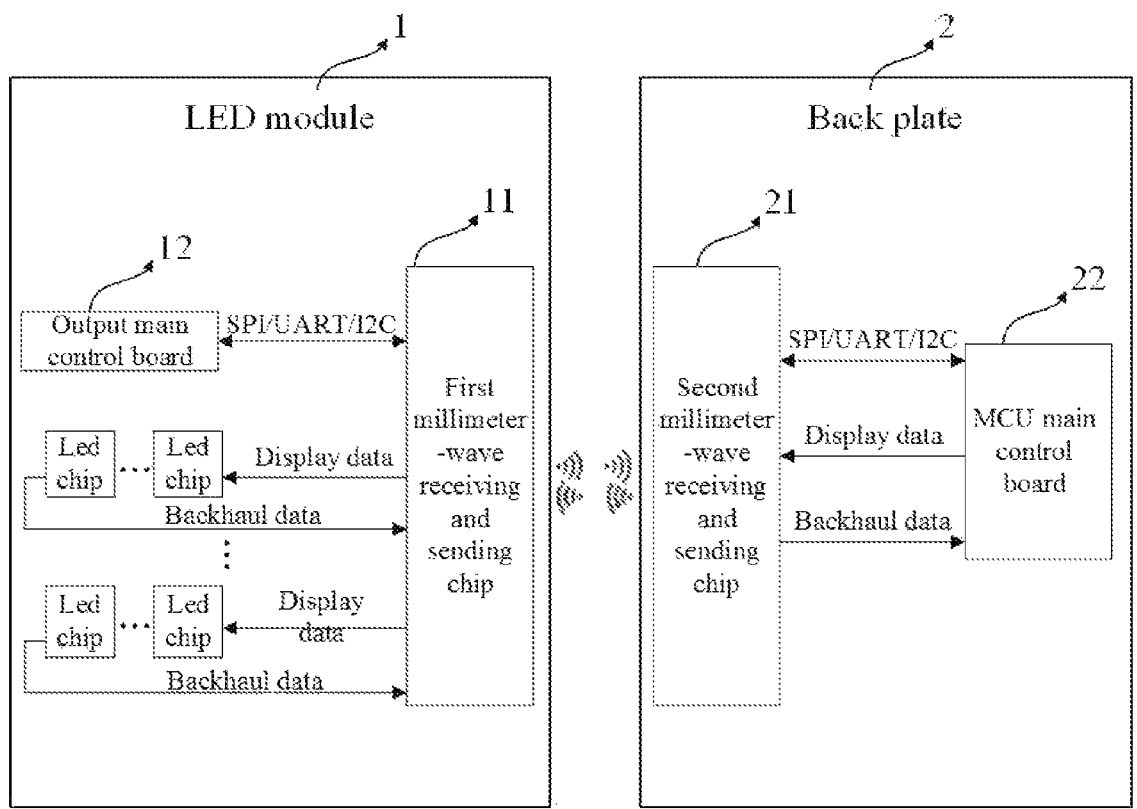
FIG. 3 is a schematic diagram II of the display device adopting a millimeter-wave communication provided in the specific implementation mode of the present application.

As shown in FIG. 2-3, a display device adopting millimeter wave communication provided in the embodiment includes a back plate 2 and a light-emitting diode (LED) module 1, wherein the back plate 2 is configured to acquire input data, to generate image data after analyzing and processing the input data, and to send the image data to the LED module 1, and the LED module 1 is configured to receive video data sent by the back plate 2, and to display the video data through an LED after analyzing the video data; and the LED module 1 includes a first millimeter-wave communication chip 11 and a second millimeter-wave communication chip 12, wherein the first millimeter-wave communication chip 11 is configured to be in communication connection with the back plate 2; the output main control board 12 is configured to receive data of the first millimeter-wave communication chip 11 for outputting and displaying; the first millimeter-wave communication chip 11 is electrically connected to the output main control board 12; and the back plate 2 includes a second millimeter-wave communication chip 21 and a microcontroller unit (MCU) main control board 22, wherein the second millimeter-wave communication chip 21 is configured to receive a control signal and relevant data of the MCU main control board 22 and to be in communication connection with the LED module 1; the MCU main control board 22 is configured to receive each input signal, to analyze and process the input signal, and to control operation of the second millimeter-wave communication chip 21; and the second millimeter-wave communication chip 21 is electrically connected to the MCU main control board 22. Specifically, the back plate 2 is connected to the plurality of LED modules 1. When the back plate 2 is connected to the plurality of LED modules 1, there will be many connecting cables which are complex during connection. Connecting interface for communication cables are further needed for the back plate 2 and the LED modules 1, which will occupy a lot of spatial structures of the back plate 2 or the LED modules 1. The first millimeter-wave communication chip 11 arranged on the back plate 2 and the second millimeter-wave communication chip 21 arranged on each of the LED modules 1 in the embodiment are in communication connection in the time division multiplexing mode, and the functions of the cables are replaced by data interaction of the millimeter-wave communication chips, so that the cables are canceled, and the back plate 2 and the LED modules 1 may not be provided with the communication connection interfaces, and thus, the structure sets of the back plate 2 and the LED modules 1 are simplified.

In an embodiment, the first millimeter-wave communication chip 11 is in communication connection with the second millimeter-wave communication chip 21. The first millimeter-wave communication chip 11 and the second millimeter-wave communication chip 21 adopt the time division multiplexing communication mode. Specifically, time division multiplexing refers to dividing a time provided to the whole channel transmission information into a plurality of time slices (time slots for short) and distributing the time slots to each signal source for use. Each signal monopolizes the channel within its own time slot for data transmission. The characteristic of the time division multiplexing technique is that the time slots are planned and distributed well in advance and remain constant, so it is sometimes called synchronous time division multiplexing, with the advantages of fixed time slot distribution, convenience in adjustment and control and adaptability to transmission of digital information. Therefore, the first millimeter-wave communication chip 11 and the second millimeter-wave communication chip 21 for the present application transmit image information stably, and it is convenient to adjust.

In an embodiment, the display device further includes an input module 3, wherein the input module 3 is in communication connection with the back plate 2, and is configured to input image signals. Specifically, the input module 3 is configured to input the image signals to the back plate 2. Usually, the input module 3 inputs a plurality of image signals to the back plate 2, the back plate 2 analyzes and processes the image signals and then sends the same to the LED module 1, and the LED module 1 displays the image signals, thereby finally, achieving splicing and displaying effects, and the like.

In an embodiment, the input module 3 includes a third millimeter-wave communication chip 32 and an input main control board 31, and the third millimeter-wave communication chip 32 is configured to be in communication connection with the first millimeter-wave communication chip 11 and to send the image signals to the first millimeter-wave communication chip 11. Specifically, the input main control board 31 is configured to control signal sending of the third millimeter-wave communication chip 32, and a third millimeter-wave receiving and sending chip is configure to send corresponding image signals to the first millimeter-wave communication chip 11 in the time division multiplexing communication mode as well.

In an embodiment, the LED module 1 further includes an output video interface circuit 13 and an output audio separation circuit 14, wherein a first output interface of the output main control board 12 is electrically connected to the output video interface circuit 13, and a second output interface of the output main control board 12 is electrically connected to the output audio separation circuit 14. Specifically, the output video interface circuit 13 is configured to output video signals independently, and the output audio separation circuit 14 is configured to output audio signals independently. Under a circumstance of actual use, the video signals or the audio signals will be outputted independently, and the video signals and the audio signals can be outputted independently, which means that in the embodiment, spliced outputs of videos and audios can be achieved, so that the application range of the embodiment is expanded.

In an embodiment, the output video interface circuit 13 includes a high-definition output chip and a high-definition multimedia interface (HDMI), a signal output terminal of the high-definition output chip is electrically connected to the HDMI, and a signal input terminal of the high-definition output chip is electrically connected to the output main control board 12. Specifically, to facilitate independent output of the video signals, the output video interface circuit 13 the high-definition output chip and the HDMI, the signal output terminal of the high-definition output chip is electrically connected to the HDMI, and the signal input terminal of the high-definition output chip is electrically connected to the output main control board 12. As the independent output video interface circuit 13 is arranged, the video signals can be outputted independently.

In an embodiment, the output audio separation circuit 14 includes a decoding chip, and a signal input terminal of the decoding chip is electrically connected to the output main control board 12. Specifically, to facilitate independent output of the audio signals, the output audio separation circuit 14 includes the decoding chip, and the signal input terminal of the decoding chip is electrically connected to the output main control board 12. The audio signals can be decoded by the decoding chip, so that the outputted audio signals can be played by a player. As the independent output audio separation circuit 14 is arranged, the audio signals can be outputted independently.

Embodiment III

Figure 4:
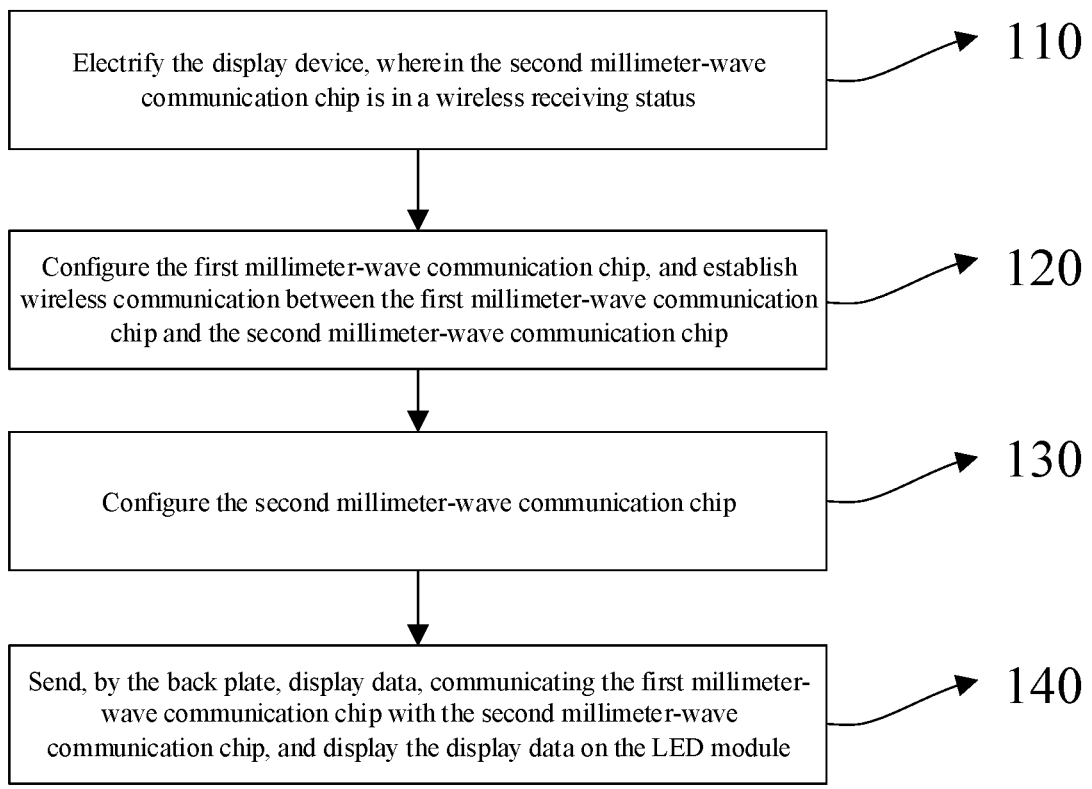
FIG. 4 is a schematic diagram I of a method adopting a millimeter-wave communication provided in the specific implementation mode of the present application.
Figure 5:
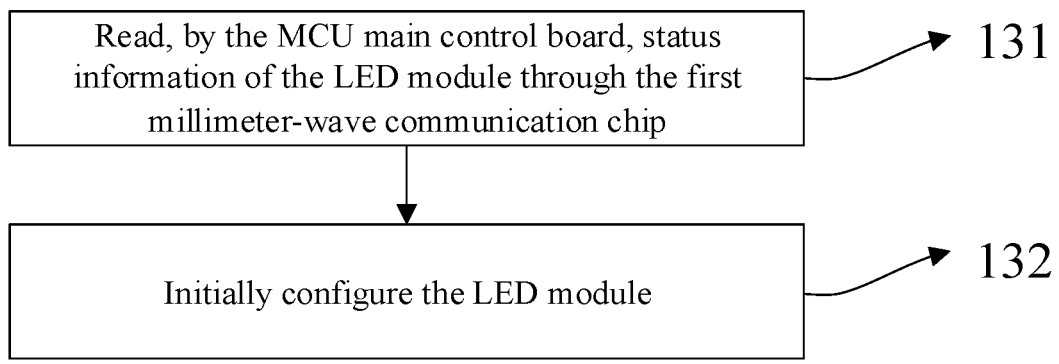
FIG. 5 is a schematic diagram II of the method adopting a millimeter-wave communication provided in the specific implementation mode of the present application.
Figure 6:
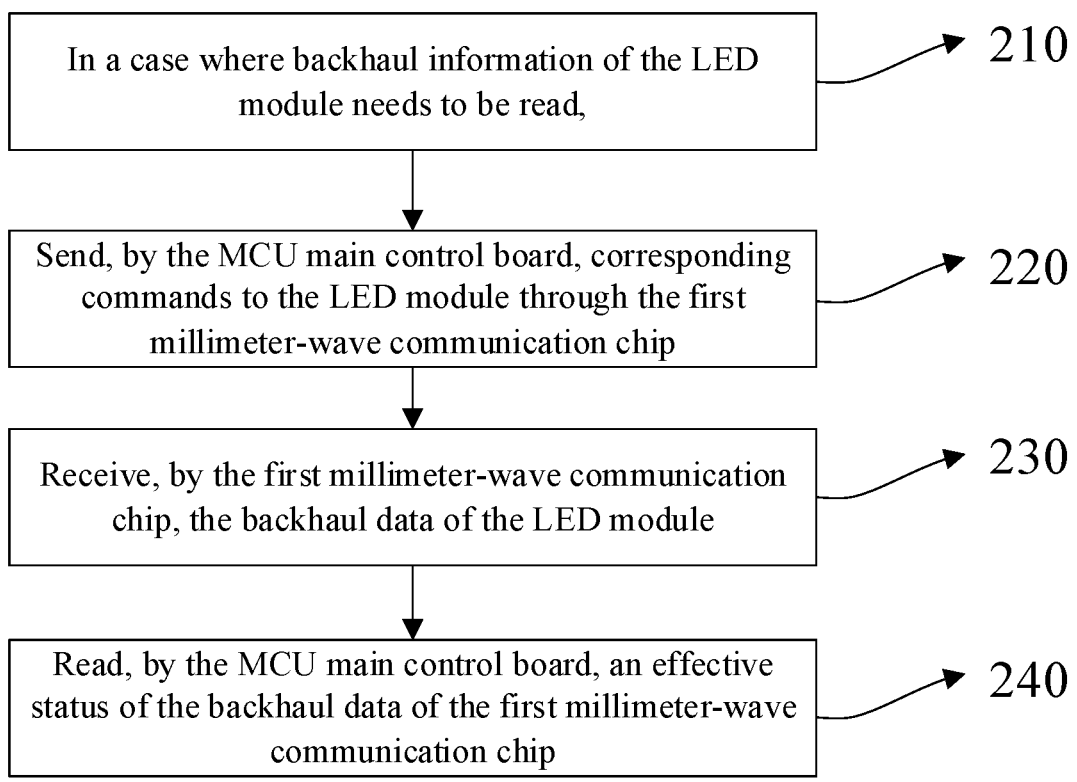
FIG. 6 is a schematic diagram III of the method adopting a millimeter-wave communication provided in the specific implementation mode of the present application.

As shown in FIGS. 4-6, a method adopting millimeter-wave communication, applied to the display device adopting millimeter-wave communication, including the following steps:

S110, the display device is electrified, wherein the second millimeter-wave communication chip 21 is in a wireless receiving status;

S120, the first millimeter-wave communication chip 11 is configured, and wireless communication between the first millimeter-wave communication chip and the second millimeter-wave communication chip 21 is established;

S130, the second millimeter-wave communication chip 21 is configured; and

S140, the back plate 2 sends display data, the first millimeter-wave communication chip 11 is communicated with the second millimeter-wave communication chip 21, and the display data is displayed on the LED module 1.

Specifically, when the display device is electrified, the second millimeter-wave communication chip arranged on the LED module 1 is in a wireless receiving status by default, and the first millimeter-wave communication chip arranged on the back plate 2 is configured and arranged by the MCU main control board 22 of the back plate 2 to establish wireless communication with the second millimeter-wave communication chip 21;

there are two modes to configure the second millimeter-wave communication chip 21: first, the MCU main control board 22 can configure the second millimeter-wave communication chip 21 through the first millimeter-wave communication chip 11; second, if the output main control board 12 of the LED module 1 is provided with a control chip similar to the MCU, the second millimeter-wave communication chip 21 can be configured by the control chip of the LED module 1; and the back plate 2 sends the display data, the first millimeter-wave communication chip 11 is communicated with the second millimeter-wave communication chip 21, and the display data is displayed on the LED module 1; the specific process is as follows: the back plate 2 sends the display data to the first millimeter-wave communication chip 11; as the first millimeter-wave communication chip 11 is in wireless communication connection with the second millimeter-wave communication chip 21, the first millimeter-wave communication chip 11 sends the display data to the second millimeter-wave communication chip 21, the second millimeter-wave communication chip 21 receives the display data and transmits the display data to the output control board of the LED module 1, and the output control board outputs the display data to the LED module 1 for displaying.

In an embodiment, after configuring the second millimeter-wave communication chip 21, the method further includes the following steps:

S131, the MCU main control board 22 reads status information of the LED module 1 through the first millimeter-wave communication chip 11; and S132, the LED module 1 is initially configured.

Specifically, the MCU main control board 22 reads initialized status information such as FLASH information on the LED module 1 through the first millimeter-wave communication chip 11. According to the read initialized status information, the MCU main control board 22 further needs to be combined with a task needed to be executed at present, or to initially configure the LED module 1 correspondingly.

In an embodiment, the method further includes the following steps:

S210, in a case where backhaul information of the LED module 1 needs to be read, S220, the MCU main control board 22 sends corresponding commands to the LED module 1 through the first millimeter-wave communication chip 11;

S230, the first millimeter-wave communication chip 11 receives the backhaul data of the LED module 1; and S240, the MCU main control board 22 reads an effective status of the backhaul data of the first millimeter-wave communication chip 11.

Specifically, if the back plate 2 needs to read the backhaul information of the LED module 1, it sends the corresponding commands to the LED module 1 through the first millimeter-wave communication chip 11, the LED module 1 feeds back corresponding data information according to the corresponding commands, the first millimeter-wave communication chip receives the data information fed back and reads the backhaul data, and then the data is read by the SPI/UART/I2C interface; and further, the MCU main control board 22 can further control the display device to enter a sleep mode or awaken the display device to enter a working status again as needed.

The above is merely the preferred embodiments of the present application rather than limiting the present application. Any modification, equivalent substitution, improvement and etc. made within the spirit and principle of the present application shall fall within the scope of protection of the present application.

What is claimed is:

1. A display device adopting millimeter wave communication, comprising a back plate, a first millimeter-wave communication chip, a second millimeter-wave communication chip, and a light-emitting diode (LED) module, wherein the back plate is configured to acquire input data, to generate image data after analyzing and processing the input data, and to send the image data to the LED module, and the LED module is configured to receive video data sent by the back plate, and to display the video data through an LED after analyzing the video data, wherein each of the first millimeter-wave communication chip and the second millimeter-wave communication chip comprises:

a radio frequency (RF) module, configured to receive and send data;

a Serializer/Deserializer (SerDes) module, configured to convert parallel data into serial data or the serial data into the parallel data; and a time division multiplexing (TDM) module controlling data transmission directions of the RF module and the SerDes module by adopting a time division multiplexing mode, wherein when the SerDes module receives the parallel data of a first terminal, the TDM module sends a control signal to the SerDes module and the RF module, the SerDes module converts the parallel data into serial data and sends the serial data to the RF module, and the RF module sends the serial data to a second terminal; and when the RF module receives the serial data of the second terminal, the TDM module sends a control signal to the SerDes module and the RF module, the RF module sends the serial data to the SerDes module, and the SerDes module converts the serial data into parallel data and sends the parallel data to the first terminal, the first millimeter-wave communication chip is arranged on the LED module, and the second millimeter-wave communication chip is arranged on the back plate;

the LED module comprises an output main control board;

the first millimeter-wave communication chip is configured to be in communication connection with the back plate;

the output main control board is configured to receive data of the first millimeter-wave communication chip for outputting and displaying;

the first millimeter-wave communication chip is electrically connected to the output main control board; and the back plate comprises a microcontroller unit (MCU) main control board;

the second millimeter-wave communication chip is configured to receive a control signal and relevant data of the MCU main control board and to be in communication connection with the LED module;

the MCU main control board is configured to receive each input signal, to analyze and process the input signal, and to control operation of the second millimeter-wave communication chip; and the second millimeter-wave communication chip is electrically connected to the MCU main control board.

2. The display device adopting a millimeter-wave communication according to claim 1, wherein the first millimeter-wave communication chip is in communication connection with the second millimeter-wave communication chip, and the first millimeter-wave communication chip and the second millimeter-wave communication chip adopt a time division multiplexing communication mode.

3. The display device adopting millimeter wave communication according to claim 1, further comprising an input module, wherein the input module is in communication connection with the back plate, and is configured to input image signals.

4. The display device adopting millimeter wave communication according to claim 3, wherein the input module comprises a third millimeter-wave communication chip and an input main control board, and the third millimeter-wave communication chip is configured to be in communication connection with the first millimeter-wave communication chip and to send the image signals to the first millimeter-wave communication chip.

5. A method adopting millimeter wave communication, applied to the display device adopting millimeter wave communication according to claim 1, comprising the following steps:

electrifying the display device, wherein the second millimeter-wave communication chip is in a wireless receiving status;

configuring the first millimeter-wave communication chip, and establishing wireless communication between the first millimeter-wave communication chip and the second millimeter-wave communication chip;

configuring the second millimeter-wave communication chip; and sending, by the back plate, display data, communicating the first millimeter-wave communication chip with the second millimeter-wave communication chip, and displaying the display data on the LED module.

6. The method adopting millimeter wave communication according to claim 5, wherein after configuring the second millimeter-wave communication chip, the method further comprises the following steps:

reading, by the MCU main control board, status information of the LED module through the first millimeter-wave communication chip; and initially configuring the LED module.

7. The method adopting millimeter wave communication according to claim 5, further comprising the following steps:

in a case where backhaul information of the LED module needs to be read, sending, by the MCU main control board, corresponding commands to the LED module through the first millimeter-wave communication chip;

receiving, by the first millimeter-wave communication chip, the backhaul data of the LED module; and reading, by the MCU main control board, an effective status of the backhaul data of the first millimeter-wave communication chip.

8. The display device adopting a millimeter-wave communication according to claim 4, wherein each of the first millimeter-wave communication chip and the second millimeter-wave communication chip further comprises a data processing module, and the SerDes module is in communication connection with the first terminal through the data processing module, and wherein the data processing module is configured to receive the control signal of the TDM module, and the data processing module, according to the control signal, sends the data of the first terminal to the SerDes module after analyzing and processing the data of the first terminal, or sends the data of the SerDes module to the first terminal after analyzing and processing the data of the SerDes module.

9. The display device adopting a millimeter-wave communication according to claim 8, wherein each of the first millimeter-wave communication chip and the second millimeter-wave communication chip further comprises a plurality of interface modules and a data caching module, the interface modules are configured to be connected to the first terminal;

the data caching module is configured to establish communications between the data processing module and the interface modules;

when the interface modules receive the data of the first terminal, the interface modules send the data of the first terminal to the data caching module for caching, and the data caching module then transmits the data of the first terminal to the data processing module; and when the data processing module receives the data of the second terminal, the data processing module sends the data of the second terminal to the data caching module for caching, and the data caching module then transmits the data of the second terminal to the interface modules.

\* \* \* \* \*